United States Patent [19]

Wolstenholme

[11] 4,028,867

[45] June 14, 1977

[54] VINERS

[75] Inventor: Harold Wolstenholme, Bolton, England

[73] Assignee: Mather & Platt Limited, Manchester, England

[22] Filed: Apr. 9, 1976

[21] Appl. No.: 675,407

Related U.S. Application Data

[63] Continuation of Ser. No. 589,828, June 24, 1975, abandoned, which is a continuation of Ser. No. 487,403, July 10, 1974, abandoned, which is a continuation of Ser. No. 386,901, Aug. 9, 1973, abandoned, which is a continuation of Ser. No. 208,266, Dec. 15, 1971, abandoned.

[52] U.S. Cl. ............................... 56/12.8; 130/30 H
[51] Int. Cl.² ........................................ A01D 45/24
[58] Field of Search ................... 130/30 R, 30 H; 56/12.8, 126, 328 R, 327 R

[56] References Cited

UNITED STATES PATENTS

| | | | |
|---|---|---|---|
| 2,321,461 | 6/1943 | Christel | 130/30 H |
| 2,597,673 | 5/1952 | Ritter et al. | 130/30 H |
| 2,780,904 | 2/1957 | Bowie et al. | 56/328 R |
| 3,387,442 | 6/1968 | Henson | 56/328 R |
| 3,462,929 | 8/1969 | Ingalls | 56/328 R |

*Primary Examiner*—Russell R. Kinsey
*Attorney, Agent, or Firm*—Sughrue, Rothwell, Mion, Zinn & Macpeak

[57] ABSTRACT

A mobile viner having a beating and riddling chamber which is of greater length than conventional viners while retaining the same general diameter of the riddle chamber and in which the customary reclamation or rear cleaning unit is completely omitted. In the beating and riddling chamber the vines are subjected to a beating and riddling action save at the rear extended end of the riddling chamber within which only a riddling action is effected. The ratio of riddling chamber diameter to length is preferably 1:3.

7 Claims, 5 Drawing Figures

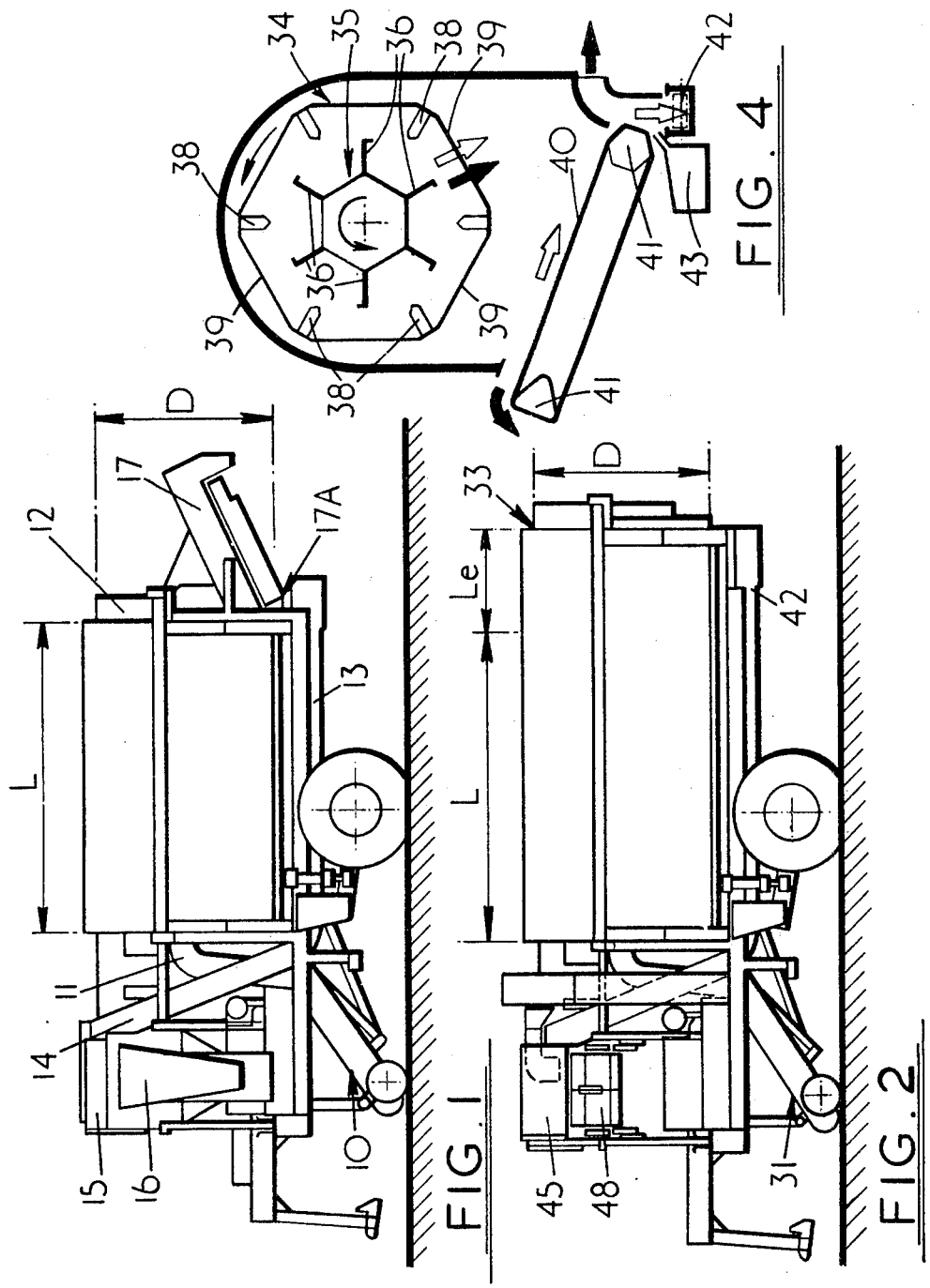

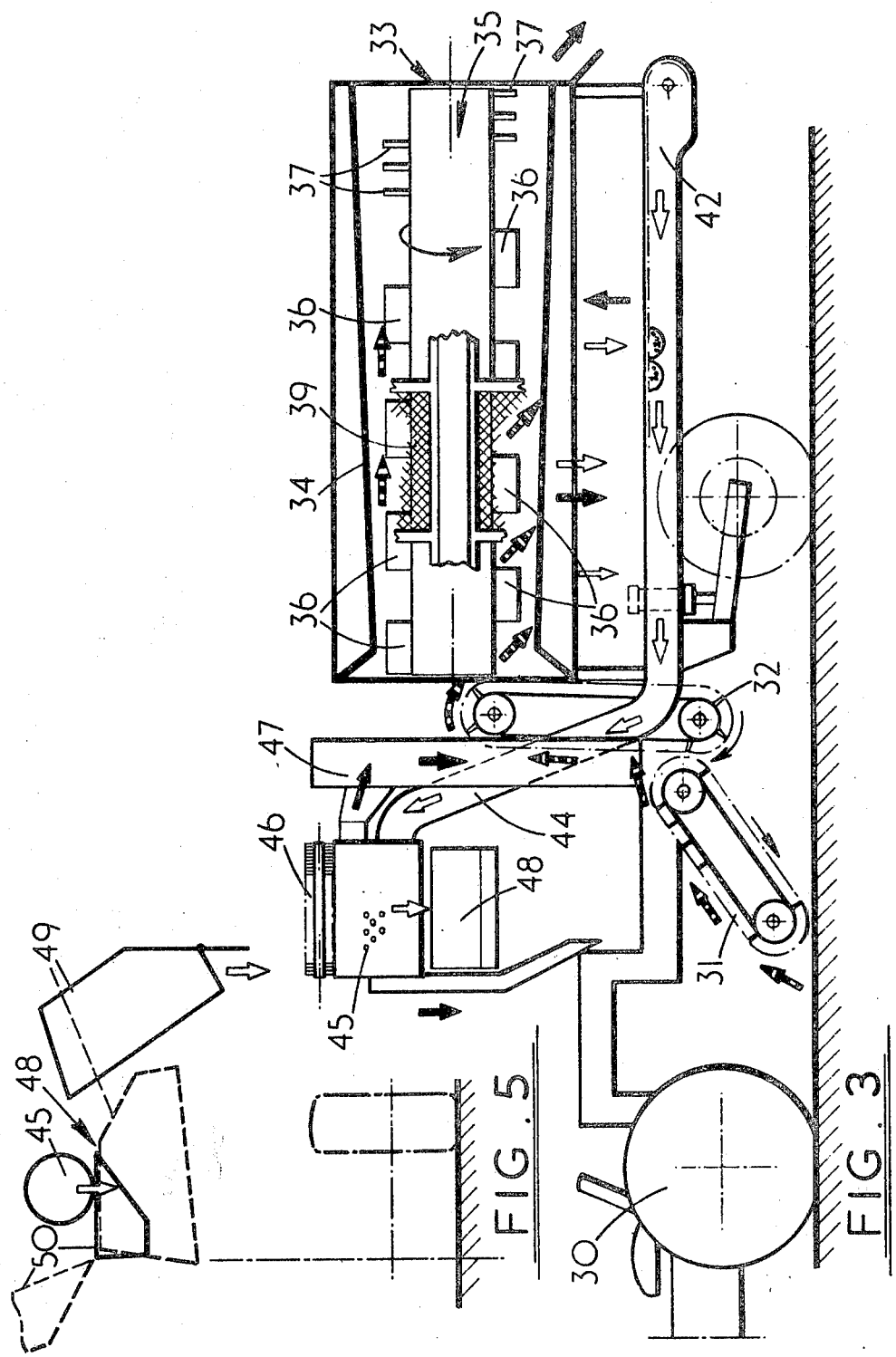

VINERS

This is a continuation of application Ser. No. 589,828, filed June 24, 1975 and now abandoned, which was a continuation of appln. Ser. No. 487,403, filed July 10, 1974, and now abandoned, which was a continuation of application Ser. No. 386,901, filed Aug. 9, 1973, and now abandoned, which was in turn a continuation of application Ser. No. 208,266, filed Dec. 15, 1971, and now abandoned.

This invention relates to mobile viners.

A mobile viner is generally tractor drawn but may be self-propelled and comprises a pick-up reel or similar, and a feed elevator for delivering the cut vine in uniform flow to a riddling and boating chamber wherein a threshing action is effected to separate the crop, i.e. the peas or broad beans, from the vines, the crop dropping through the riddle screens on to cleaning aprons where they are subjected to pneumatic cleaning before being discharged. At the rear, i.e. the discharge end of the riddling and beating chamber there is located a reclamation unit which serves to recover peas and beans from waste vines, the waste haulin being ejected off the rear of the reclamation unit on to the ground.

Reclamation units take different forms and in the simplest form may simply consist of an upwardly and rearwardly inclined openwork conveyor with a catchment bottom surface extending to a cross conveyor at the bottom and viner-adjacent end of the openwork conveyor, the arrangement being such that as non-crop material, i.e. waste haulin, emerges from the rear of the riddle drum carrying with it some of the crop it is disposed onto the openwork conveyor with the intention that crop should fall through the openwork conveyor onto the catchment surface and down the latter onto the cross conveyor which takes the crop to the main crop-receiving conveyor of the viner, the non-crop material being discharged off the top end of the openwork conveyor onto the ground.

With more sophisticated reclamation units it is customary to provide means for "stirring" the non-crop material better to effect separation of any crop carried thereby. Such means may comprise spring-loaded tines overhanging the top run of the openwork conveyor, which may be a tine conveyor, the tines co-operating to "stir" or turn the non-crop material and so assist in releasing any crop held therein.

Additional to the above, mounting points must be provided on the riddle drum to support the openwork and cross conveyors. Further, drives must be provided for the openwork and cross conveyors.

It will be manifest that these reclamation units are relatively expensive and complicate the construction of mobile viners.

It has been found from experience that most of the stoppage time of mobile viners in the fields is caused by breakages on the reclamation or rear cleaning units and those breakages, due to the fact that the tractor driven cannot see the reclamation unit of his viner, causes overfilling of the riddling and beating chamber resulting in bursting of or damage to the riddle screens.

A further disadvantage of reclamation units is that not only is crop returned to the main corp-receiving conveyor of the viner but also heavy dirt, stalks and other unwanted matter, all of which is conveyed to the crop storage hopper which means that the crop is not as clean as is desirable.

It is an object of the present invention to obviate or mitigate the aforesaid disadvantages in mobile viners resulting from the presence of reclamation or rear cleaning units.

According to the present invention there is provided a mobile viner comprising crop pick-up means and coaxial rotatable riddle and beater drums for separating the edible crop from the vines, other vegetable matter, stones and soil (hereinafter simply called "non-crop material") in which the non-crop material is discharged directly from the rear of the riddle drum onto the ground with lesser waste of edible crop than hitherto.

Preferably, the ratio of riddle drum diameter to length is between 1:2.60 and 1:3.20.

Preferably also, the ratio is 1:3.

An embodiment of the present invention will now be described, with reference to FIGS. 2 to 5 of the accompanying drawings, in which:

FIG. 1 is a diagrammatic side elevation of a conventional mobile viner;

FIG. 2 is a similar diagrammatic side elevation of a mobile viner according to the present invention;

FIG. 3 Is a flow diagram of a mobile viner according to the present invention;

FIG. 4 is a cross-section of the riddling and beating chamber; and,

FIG. 5 is a diagrammatic view of the storage hoppers in receiving and discharging positions.

Referring firstly to FIG. 1 of the drawings, a conventional mobile viner which is normally tractor drawn has pick-up reel or similar 10, and a feed elevator 11 for delivering the cut vine to a riddling and beating chamber 12 wherein the peas or broad beans are separated from the vines, the former passing through riddle screens, falling on to inclined cleaning aprons (not shown) and being subjected, as is usual, to a pneumatic cleaning operation, whereafter they are conveyed by a bucket conveyor 13 to the front of the viner and a bucket elevation 14 via a rotatable mesh cleaning drum 15 to a storage hopper 16.

Any stalks, dirt or other non-crop material which passes through the riddle screens is discharged laterally of the viner from the tops of the cleaning aprons. Similarly, any non-crop material carried to the mesh cleaning drum 15 is discharged axially thereof. However, the majority of non-crop material, i.e. waste vines or haulin, dirt, stones, etc., which carries with it some of the crop is discharged from the rear of the chamber 12 onto a reclamation or rear cleaning unit comprising an upwardly inclined openwork conveyor 17 and a cross conveyor 17A as previously described with the consequent disadvantages previously mentioned.

With mobile viners the diameter to length ratio of the riddling and beating chamber, i.e. riddle drum diameter and length, is fairly standard in the region of 1:2.27, a fairly standard riddle drum having a length (L) of 12 foot 6 inches and a diameter (D) of 5 foot 6 inches. It will be manifest that these dimensions may vary slightly from case, to case but the aforesaid ratio is more or less the same for all mobile viners.

Reference is now made to FIGS. 2 to 5 which illustrate diagrammatically a mobile viner according to the present invention.

The most important aspect of the viner is that the reclamation or rear cleaning unit has been omitted and the riddling and beating chamber length extended while maintaining the diameter of the chamber the same as that on conventional mobile viners.

The extended length (Le) of this chamber may be between 2 feet and five feet thus giving riddle drum dimensions of length (L+Le) between 14 foot 6 inches to 17 foot 6 inches with a diameter (D) of 5 feet 6 inches in each case, i.e. riddle drum length to diameter ratios of between 1:2.60 to 1:3.20.

A preferred length (L+Le) is 16 feet 6 inches giving a ratio of 1:3.

It has been found that with such an extended length riddling and beating chamber there is an improved throughput of crop for a given quantity of vine in the chamber, i.e. less crop carried away by non-crop material out of the rear of the riddling and beating chamber since there is now an extended separation length. It has also been found that there is less damage to the crop due again to this extended separation length, which means less compaction of the vines fed to the riddling and beating section.

Further, due to the omission of the reclamation unit, there is no or very little stalks and heavy dirt passed to the bucket conveyor so that the crop is delivered in a cleaner condition to the storage hopper. The cleaning of the crop is enhanced in that all the crop is subjected to an air cleaning operation which was not the case in conventional mobile viners.

A more detailed description of the mobile viner will now be described particularly with reference to FIGS. 3 to 5. In these Figures, the hatched arrows represent vines being collected from the field, the white arrow crops, and the black arrows, waste non-crop material.

The mobile viner is advanced over the fields by a tractor 30 suitably hitched to the viner.

The mobile viner comprises a crop pick-up device 31 in the form of a tined endless belt, and an elevator 32 for conveying the picked crop from the pick-up device 31 to the riddling and beating chamber 33 which consists of a riddle drum 34 and a beater drum 35 coaxial with the riddle drum 34. The riddle and beater drums 34 and 35 are rotated in the same sense but with the heater drum 35 rotating at a much higher speed than the riddle drum 34. The beater drum 35 has along its length a series of beater paddles 36 and forks 37, the forks 37 being disposed in the extended length (Le) so that at this part no beating takes place but only riddling, thus ensuring a greater quantity of edible crop collected in the bucket conveyor. The riddle drum 34 is open at front and rear and consists of a number of axially spaced beams 38 between which are detachably mounted riddle screens 39 of plastics coated metal which compared with the conventional nylon or similar riddle screens have a longer life and less tendency to clog in bad weather conditions.

Below the riddle drum 34 is a single apron 40 which extends the length of the riddle drum 34 and which is mounted on rotatable non-circular rollers 41. The apron 40 is inclined, and at its lower end is an endless bucket conveyor 42, again extending along the length of the riddle drum 34 and slightly in front thereof.

A winnowing arrangement 43 fed by an axial fan directs air between the apron 40 and the bucket conveyor 42 to assist in cleaning crop falling into the latter. The bucket conveyor 42 merges with a bucket elevator 44 which terminates at its top in a rotating mesh open-ended cleaning cylinder 45 having at its top and exterior a meshing rotating cleaning brush 46. A suction waste removal duct 47 is provided at one end of the cylinder 45, and below the cylinder 45 is a crop receiving hopper 48.

The hopper 48 is, in fact, a main hopper 49 and a subsidiary hopper 50 which are supported in a framework so as to be movable between two positions (FIG. 5). The positions shown in dotted lines indicate crop being received by the main hopper 49 with the subsidiary hopper 50 inoperative.

When the main hopper 49 is sufficiently full, both hoppers 40, 50 are swung by conventional means such as a fluid ram to the full line position whereat the main hopper 49 discharges into a collection vehicle while the subsidiary hopper 50 receives the crop from the cylinder 45. On return to the broken line position the subsidiary hopper contents are discharged into the main hopper 49.

The various drives for the moving components of the mobile viner have not been described or illustrated since they are all conventional and well-known to the man skilled in the art.

In use, as the mobile viner is advanced over the field, the vines are collected and delivered to the beating and riddling chamber 33 where they are subjected to a threshing action as they move axially along the chamber, which action opens the pods and separates the peas and broad beans which fall through the riddle screens 39 with some of the stalks and small sized dirt, pods and other non-crop material, the bulk of the non-crop material with relatively little of the crop being discharged at the rear of the chamber 33 directly onto the ground. The material falling on to the apron 40 is separated by the irregular substantially vertical and horizontal movements of the apron 40 so that the peas and beans run down into the bucket conveyor 42 while the bulk of the waste, non-crop material is discharged laterally of the viner from the top of the apron 40. The peas and broad beans further cleaned by the air winnowing arrangement 43 and are then conveyed by the bucket conveyor 42 and the bucket elevator 44 to the interior of the mesh cylinder 45 where a final separation and cleaning is effected by the suction duct 47, the final waste non-crop material being discharged axially of the cylinder 45 to the ground while the peas and broad beans are received by the hopper 49 or 50.

What is claimed is:

1. In a mobile viner comprising coaxial rotatable riddle and beater drums defining therebetween a riddling and beating chamber for separating the edible crop from the vines, other vegetable matter, stones, and soil (hereinafter simply called "non-crop material"), the improvements wherein:
    a. the non-crop material is discharged directly from the riddling and beating chamber onto the ground and
    b. the ratio of the riddle drum diameter to the riddle drum length is between 1:2.60 and 1:3.20.

2. In a mobile viner as claimed in claim 1, the improvement wherein the ratio of the riddle drum diameter to the riddle drum length is 1:3.

3. In a mobile viner as claimed in claim 1, the further improvement wherein the beater drum is provided with beaters only along the major portion thereof excepting the end thereof adjacent to where the non-crop material is discharged directly from the riddling and beating chamber onto the ground and is provided with forks which effect riddling without beating at said end.

4. The improvements claimed in claim 1 in a mobile viner which comprises:

a. an endless chain crop pick-up device;
b. an elevator operatively connected to the endless chain crop pick-up device for raising the crop from the crop pick-up device into the riddling and beating chamber;
c. first means for rotating the beater drum;
d. second means for rotating the riddle drum in the same sense as the beater drum but at a slower speed;
e. a single inclined apron disposed beneath the riddling and beating chamber on to which the separated crop and some of the non-crop material falls;
f. a blower disposed at the bottom of the apron to assist in cleaning the crop and further separating it for the non-crop material;
g. a storage hopper; and
h. third means operatively connected to the single inclined apron for receiving and moving the crop to the storage hopper.

5. The improvement claimed in claim 4 in a mobile viner wherein said third means comprise:

a. a horizontal bucket conveyor disposed beneath the lower edge of the inclined apron;
b. a bucket elevator operatively connected to the horizontal bucket conveyor;
c. a rotary mesh cleaning cylinder into which the bucket elevator delivers the crop; and
d. a suction device operatively connected to the cleaning cylinder and the storage hopper so as to move the crop from the cleaning cylinder into the storage hopper while allowing axial discharge from the cleaning cylinder of any non-crop material.

6. The improvement claimed in claim 5 wherein said third means further comprises a suction duct operatively associated with the cleaning cylinder for axially removing waste non-crop material from the cleaning cylinder.

7. The improvement claimed in claim 4 wherein
a. said mobile viner further comprises a subsidiary hopper associated with the storage hopper for receiving the crop during discharge of the storage hopper and
b. the storage hopper is movable from a crop-receiving position to a crop-discharge position.

* * * * *